United States Patent
Benson et al.

(10) Patent No.: US 12,544,138 B2
(45) Date of Patent: Feb. 10, 2026

(54) PRE-OPERATIVE PLAN GENERATION FOR AN OPERATION ON A SPINE

(71) Applicant: Medicrea International, Rillieux-la-Pape (FR)

(72) Inventors: Nicholas Benson, Collierville, TN (US); Adam K. Deitz, Austin, TX (US)

(73) Assignee: MEDICREA INTERNATIONAL (FR)

( * ) Notice: Subject to any disclaimer, the term of this patent is extended or adjusted under 35 U.S.C. 154(b) by 1179 days.

(21) Appl. No.: 17/479,303

(22) Filed: Sep. 20, 2021

(65) Prior Publication Data

US 2023/0092357 A1 Mar. 23, 2023

(51) Int. Cl.
| | |
|---|---|
| *A61B 34/10* | (2016.01) |
| *A61B 34/00* | (2016.01) |
| *G06N 20/00* | (2019.01) |
| *G16H 10/60* | (2018.01) |
| *G16H 20/40* | (2018.01) |

(52) U.S. Cl.
CPC ............. *A61B 34/10* (2016.02); *G06N 20/00* (2019.01); *G16H 10/60* (2018.01); *G16H 20/40* (2018.01); *A61B 2034/101* (2016.02); *A61B 2034/107* (2016.02); *A61B 2034/108* (2016.02); *A61B 2034/256* (2016.02)

(58) Field of Classification Search
None
See application file for complete search history.

(56) References Cited

U.S. PATENT DOCUMENTS

| | | | |
|---|---|---|---|
| 9,299,138 | B2 | 3/2016 | Zellner et al. |
| 10,064,686 | B2 | 9/2018 | McKinnon et al. |
| 10,098,761 | B2 | 10/2018 | Sherman et al. |
| 10,166,019 | B2 | 1/2019 | Nawana et al. |
| 10,748,115 | B2 | 8/2020 | Laster et al. |
| 2014/0013565 | A1 | 1/2014 | MacDonald et al. |
| 2014/0228860 | A1 | 8/2014 | Steines et al. |
| 2016/0287337 | A1 | 10/2016 | Aram et al. |
| 2018/0358120 | A1 | 12/2018 | Schoenefeld et al. |
| 2019/0146458 | A1 | 5/2019 | Roh et al. |
| 2020/0030034 | A1 | 1/2020 | Kontaxis et al. |
| 2020/0275976 | A1 | 9/2020 | Mckinnon et al. |

FOREIGN PATENT DOCUMENTS

| | | |
|---|---|---|
| EP | 3499514 A1 | 6/2019 |
| WO | 2007009263 A1 | 1/2007 |
| WO | 10068212 A1 | 6/2010 |
| WO | 2020023428 A1 | 1/2020 |
| WO | 2020033319 A1 | 2/2020 |
| WO | 2021127161 A1 | 6/2021 |

OTHER PUBLICATIONS

Cabitza, Federico, Angela Locoro, and Giuseppe Banfi. "Machine learning in orthopedics: a literature review." Frontiers in bioengineering and biotechnology 6 (2018): 75.*

Cilla, Myriam, et al. "Machine learning techniques for the optimization of joint replacements: Application to a short-stem hip implant." Plos one 12.9 (2017): e0183755.*

International Search Report and Written Opiniion in Application No. PCT/IB2022/000528 mailed Dec. 22, 2022.

* cited by examiner

*Primary Examiner* — G. Steven Vanni
(74) *Attorney, Agent, or Firm* — FOX ROTHSCHILD LLP (57) ABSTRACT

A method and system for automatically generating a pre-operative plan is disclosed that may include using a computing device to receive, from an electronic device associated with a physician, an identification message comprising identifying information associated with a target patient for a surgical procedure. The computing device may retrieve medical information associated with the target patient based on the identifying information, and apply machine learning models to identify a predicted condition of the target patient and to predict a surgical approach and one or more surgical components to use and may generate a surgical plan that comprises an indication of the surgical approach and an indication of the one or more surgical components.

20 Claims, 7 Drawing Sheets

600 cha

Two patients in past 30 days:
1=Brown, Charlie 12/17/1982 (M)
2=Chapman, Charlie 01/05/1962 (M)
3=31 to 60 days back
4=61+ days back

1

L45 Soondy identified
1 = Confirm L4L5 fusion
2 = Confirm L4S1 fusion
3 = Decompression only
Else enter fusion level

PRE-OPERATIVE PLAN GENERATION FOR AN OPERATION ON A SPINE

TECHNICAL FIELD

The present disclosure generally relates to an automated planning system for pre-surgical planning.

BACKGROUND

Currently, surgeons typically use a manual workflow to plan a surgical case at a time following the general decision to operate on a patient. The decision to operate usually involves selection of an anatomical target (e.g., in spinal surgery, the L4-L5 spinal segment) as well as a type of procedure (e.g., in spinal surgery, fusion or decompression). Once these parameters have been selected by the surgeon, the next step is to plan the surgery based on one or more parameters. These parameters may indicate a surgical approach, one or more implants or implant types that will be used, and what size(s) of implants will be used.

Because of the complexity and burden involved in pre-surgical planning, many surgeons have not incorporated pre-operative planning into their practices. An intelligent, automated solution for pre-surgical planning would reduce the complexity and burden that is involved in pre-surgical planning, which would lead to greater adoption by surgeons.

This document describes methods and systems that are directed to addressing the problems described above, and/or other issues.

SUMMARY

In an embodiment, a method and system for automatically generating a pre-operative plan that includes using a computing device to receive, from an electronic device associated with a physician, an identification message comprising identifying information associated with a target patient for a surgical procedure. In this embodiment, the computing device retrieves medical information associated with the target patient based on the identifying information, applies a first machine learning model to at least a portion of the medical information to identify a predicted condition of the target patient, and transmits an indication of the predicted condition to the electronic device. In this embodiment a confirmation message of the predicted condition is received by the computing device from the electronic device. In response, the computing device applies a second machine learning model to the predicted condition to predict a surgical approach and one or more surgical components to use and generates a surgical plan that comprises an indication of the surgical approach and an indication of the one or more surgical components.

In another embodiment, the identifying information comprises a full name of the target patient or a date of birth of the target patient.

In another embodiment, the computing device trains the first machine learning model on a data set for the surgical procedure, wherein the data set comprises one or more images depicting one or more conditions of anatomy corresponding to the surgical procedure. In this embodiment, the computing device applies the trained first machine learning model to the at least a portion of the medical information to identify the predicted condition.

In another embodiment, the computing device trains the first machine learning model on a data set for the surgical procedure, wherein the data set comprises one or more images depicting one or more conditions of anatomy corresponding to the surgical procedure and feedback from the physician diagnosing a condition depicted in an image. In this embodiment, the computing device applies the trained first machine learning model to the at least a portion of the medical information to identify the predicted condition.

In another embodiment, the computing device trains the second machine learning model on a data set for the surgical approach, wherein the data set comprises surgeon preferences for the predicted condition. In this embodiment, the computing device applies the trained second machine learning model to the predicted condition to predict the surgical approach.

In another embodiment, the computing device applies the second machine learning model to the predicted condition to determine a shape and a size associated with the one or more implants based on radiographic images of the target patient.

In another embodiment, the computing device applies the first machine learning model to at least a portion of the medical information to determine a probability of the predicted condition of the target patient, and applies the first machine learning model to at least a portion of the medical information to determine a probability of a second predicted condition of the target patient. In this embodiment, the computing device transmits the probability of the predicted condition and the probability of the second predicted condition to the electronic device.

In another embodiment, the computing device receives one or more radiographic measurements associated with the target patient and predicts one or more surgical components based on the one or more radiographic measurements.

In another embodiment, the computing device selects the one or more surgical components from a surgical component data store.

In another embodiment, the computing device applies the first machine learning model to at least a first portion of the medical information and at least a second portion of the medical information to identify the predicted condition of the target patient based on a difference between the first portion and the second portion.

DETAILED DESCRIPTION

In some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other and are not necessarily "superior" and "inferior". Generally, similar spatial references of different aspects or components indicate similar spatial orientation and/or positioning, i.e., that each "first end" is situated on or directed towards the same end of the device. Further, the use of various spatial terminology herein should not be interpreted to limit the various insertion techniques or orientations of the implant relative to the positions in the spine.

The following terms shall have, for purposes of this application, the respective meanings set forth below:

A "computing device," "electronic device," or "computer" refers a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, mobile electronic devices such as smartphones, Internet-connected wearables, tablet computers, laptop computers, and appliances and other devices that can communicate in an Internet-of-things arrangement. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion below, a client device, server device, virtual machine or container may be referred to simply as a "device" for brevity. Additional elements that may be included in electronic devices will be discussed below in the context of FIG. 7.

The terms "memory," "computer-readable medium" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

The system(s) described in this disclosure are generally directed to systems that implement an automated pre-planning workflow. The automation includes identifying a patient for whom a general decision to operate has been made by a surgeon, identifying a target condition for the operation, identifying the surgical approach to be used by the surgeon, identifying an implant family to be used as part of the procedure, sizing the identified implant, facilitating a plan acceptance at the time of surgery, and/or providing patient-specific and/or implant information to the surgeon and/or surgical team as part of the procedure.

Figure 1:
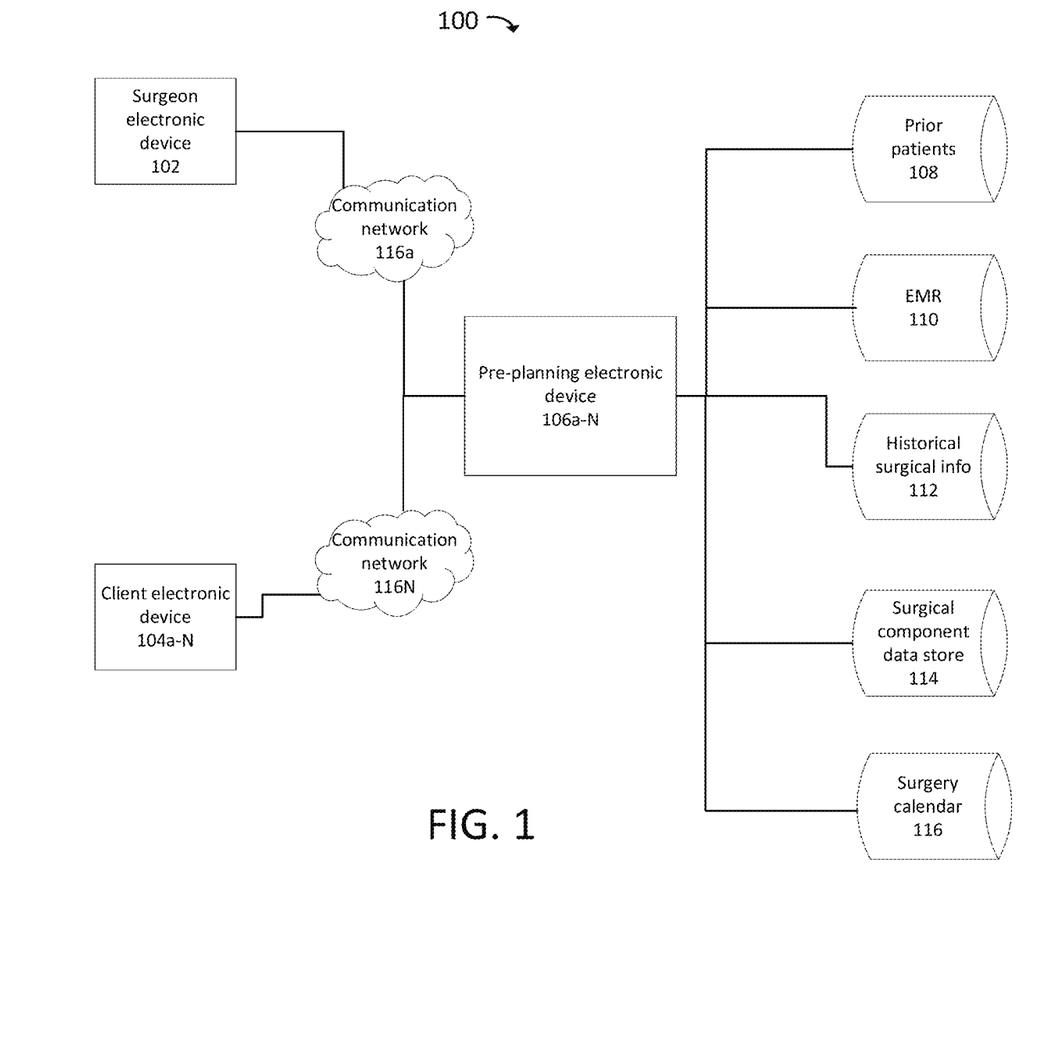
FIG. 1 shows an example pre-planning system.

FIG. 1 illustrates an example pre-planning system 100 according to an embodiment. As illustrated in FIG. 1, a pre-planning system 100 may include a surgeon client electronic device 102, one or more client electronic devices 104a-N, and one or more pre-planning electronic devices 106a-N.

In an embodiment, a surgeon client electronic device 102 and/or one or more client electronic devices 104a-N may be an electronic device used to receive input associated with a patient and/or surgical procedure. For instance, a surgeon client electronic device 102 and/or a client electronic device 104a-N may be a smartphone, tablet, mobile device, or computer. In various embodiments, a surgeon client electronic device 102 may belong to or be associated with a surgeon. For example, a surgeon client electronic device 102 may be a smartphone associated with a surgeon.

In various embodiments, a pre-planning electronic device 106a-N may be a server or other electronic device. One or more pre-planning electronic devices 106a-N may store and/or access patient and/or surgical information associated with a surgery being planned, and may use this information to automate one or more portions of a pre-planning workflow for one or more surgeons. As explained in more detail below, one or more pre-planning electronic devices 106a may train and/or apply one or more machine learning algorithms to patient and/or surgical data to automatically predict a target patient, a condition of that patient, a surgical approach, information pertaining to one or more surgical components to be used, and/or the like.

One or more pre-planning electronic devices 106a-N may include or be in communication with one or more data stores. As illustrated in FIG. 1, one or more pre-planning electronic devices 106a-N may include or be in communication with a patient data store 108. The patient data store 108 may store patient information corresponding to one or more current or prior patients of one or more surgeons. This information may include patient names, unique identifiers, addresses, age, and/or the like. In various embodiments, at least a portion of patient information may be stored such that it is keyed to a particular surgeon for the associated patient. For example, patient information associated with a patient may be stored such that it is associated with that patient's surgeon.

One or more pre-planning electronic devices 106a-N may include or be in communication with an electronic medical record (EMR) data store 110. An EMR data store 110 may store electronic medical records for one or more patients. Electronic medical records may include one or more diagnoses, medical history, lab results, medications, physician notes, images (such as x-ray images, catscan or CT images, radiographs, MRIs), and/or the like for one or more patients.

One or more pre-planning electronic devices 106a-N may include or be in communication with a historical surgery data store 112. A historical surgery data store 112 may store information associated with one or more past surgeries for one or more patients. This information may include the surgeon who performed the procedure, the date of the surgery, notes about the procedure, any implants or other surgical components used, health metrics of the patient during and/or after the surgery and/or the like. In various embodiments, a historical surgery data store 112 may be part of an EMR data store 110. In other embodiments, a historical surgery data store 112 may be separate from an EMR data store 110.

In various embodiments, one or more pre-planning electronic devices 106a-N may include or be in communication with a surgical component data store 114. The surgical component data store 114 may store information pertaining to one or more medical implants or other surgical components. Medical implant information may include a brand, an implant type (e.g., knee, spinal, etc.), one or more dimensions of the implant, a shape of the implant, and/or the like. The surgical component data store 114 may also include inventory management features. For example, the surgical component data store 114 may indicate whether surgical components are in stock. In various embodiments, one or more pre-planning electronic devices 106a-N may include or be in communication with a Surgery calendar 116. The Surgery calendar 116 may include information about planned surgeries, including time, place, staff, patient, type of procedure, selected surgical components, and the like.

As illustrated by FIG. 1, a surgeon client electronic device 102 and/or one or more client electronic devices 104a-N may communicate with one or more pre-planning electronic devices 106a-N via one or more communication networks 116a-N. A communication network 116a-N may be a local area network (LAN), a wide area network (WAN), a mobile or cellular communication network, an extranet, an intranet, the Internet, a short-range communication network and/or the like. Although FIG. 1 shows separate communication networks 116a-N, it is to be understood that these networks, or some combination of these networks, may be implemented as a single communication network.

Figure 2:
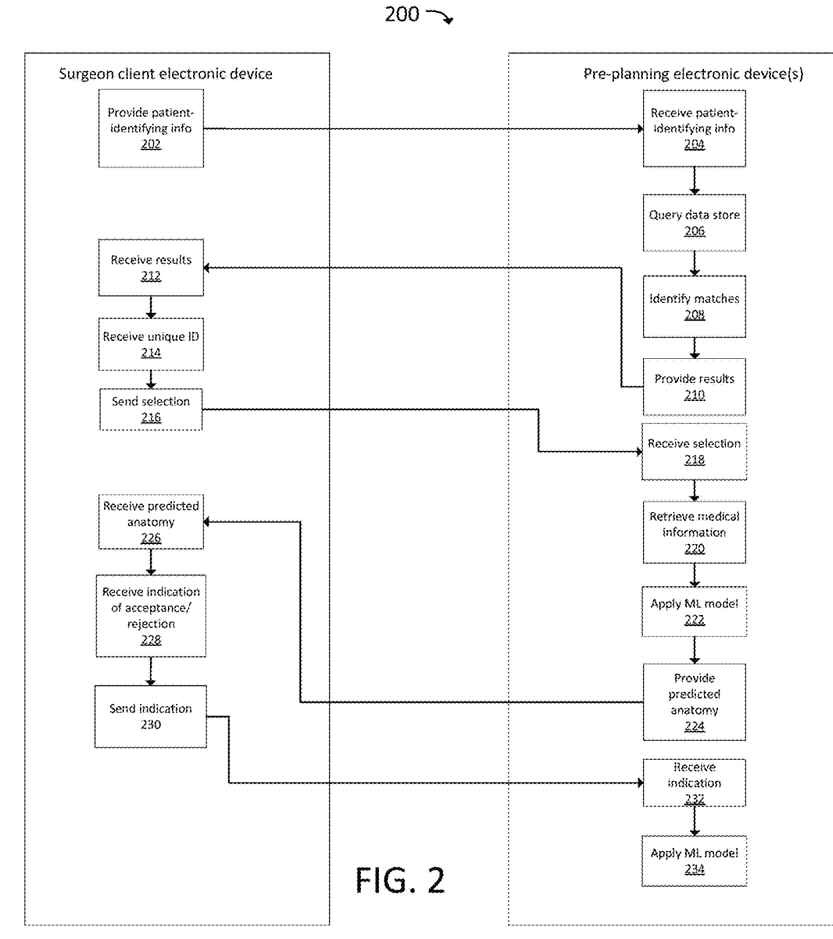
FIG. 2 shows an example method of automating a pre-operative plan.

FIG. 2 illustrates an example method 200 of automating and/or automatically generating a pre-operative plan according to an embodiment. As illustrated by FIG. 2, a user may use a surgeon client electronic device 102 to provide 202 at least a portion of patient identifying information to one or more pre-planning electronic devices 106 pertaining to a target patient. A target patient refers to a patient for whom a surgeon would like to generate a pre-operative plan.

Patient identifying information may include at least a portion of a unique identifier associated with a patient. For example, patient identifying information may include a certain number of characters of a target patient's first name, last name, date of birth, or other unique identifier. In various embodiments, a user may provide 202 at least a portion of patient identifying information via a software application (e.g., a secure application form, web browser, and/or the like). In other embodiments, a user may provide 202 at least a portion of patient identifying information via short message service (SMS).

For example, a user may text to a specific phone number associated with one or more pre-planning electronic devices 106 a message that includes a certain number (e.g., two or more) of letters of the target patient's last name. In other embodiments, the user may text a message that includes a certain number of letters of the target patient's first name, or a certain number of digits of a target patient's date of birth or a portion of the patient's social security number, driver's license number, or other government-issued identification number.

The one or more pre-planning electronic devices 106 may receive 204 the patient identifying information, and may query 206 a data store (e.g., the patient data store 108) using at least a portion of the patient identifying information to identify the target patient. The patient data store 108 may be a Picture Archiving and Communication Systems (PACS) database, an EMR data store, or other data store containing images or records for a patient matching the patient identifying information.

For example, one or more pre-planning electronic devices 106 may compare at least a portion of the received patient identifying information to information stored in a data store to identify the target patient. For instance, if the patient identifying information includes the first three letters of the target patient's last name, the one or more pre-planning electronic devices 106 may compare at least a portion of these characters to one or more entries of a data store to determine if there is a match. In various embodiments, the comparison may be performed in the context of one or more parameters. An example parameter may include, without limitation, a given time period. For example, one or more pre-planning electronic devices 106 may compare at least a portion of the received patient identifying information to information of a data store that has been either requested or updated within the previous 30 days. Additional and/or alternate parameters and/or parameter values may be used within the scope of this disclosure.

The one or more pre-planning electronic devices 106 may identify 208 one or more matches as results. For example, if more than one patient matches the query, the one or more pre-planning electronic devices 106 may identify all of the matching patients as results. In other embodiments, the one or more pre-planning electronic devices 106 may identify a subset of matching patients as results.

The one or more pre-planning electronic devices 106 may provide 210 at least a portion of the results to the surgeon client electronic device 102. The results may include the match's full name and date of birth. For example, in the above example, the one or more pre-planning electronic devices 106 may cause an SMS message to be sent to the surgeon client electronic device 102 with a unique identifier associated with each result. For example, each result may be presented with a numerical reference such as "1", "2", "3", etc. Additional and/or alternate unique identifiers may be used within the scope of this disclosure. The results may be presented in the order that the patients were most recently seen by the surgeon. The surgeon client electronic device 102 may receive 212 and display the results.

In various embodiments, the user may select the unique identifier associated with the desired target patient which may be received 214 by the surgeon client electronic device 102. For example, in the context of SMS texting, the user may respond, via the surgeon client electronic device 102, with another SMS message that includes the unique identifier. As another example, the user may select the unique identifier associated with the desired target patient using a web-based form, a software application, and/or the like.

The surgeon client electronic device 102 may send 216 the selection to one or more of the pre-planning electronic devices 106. The one or more pre-planning electronic devices 106 may receive 218 the selection.

The one or more pre-planning electronic devices 106 may retrieve 220 medical information for the patient corresponding to the selection. In various embodiments, at least a portion of the medical information may be retrieved 220 from an EMR data store 110 and/or a historical surgery data store 112 as illustrated in FIG. 1, and/or one or more other data stores.

The medical information may include one or more medical records for the patient, one or more medical images associated with the patient, and/or the like. For instance, medical information may include one or more diagnoses, medical history, complications from previous surgeries, lab results, medications, physician notes, images (such as x-ray images, catscan or CT images, radiographs, MRIs), and/or the like for the patient.

In various embodiments, the system may apply 222 a machine learning model 320 (FIG. 3) to at least a portion of the retrieved medical information to identify a predicted condition of the target patient on which to operate. For example, the system may retrieve 220 x-rays for a patient, and apply 222 a machine learning model 320 to at least a portion of the x-rays to identify one or more anomalous conditions (e.g., stenosis from L3 to S1). The system may apply 222 the machine learning model 320 to multiple records or images to identify one or more anomalous conditions. For example, the system may apply 222 the machine learning model 320 to medical images of the target patient in more than one position (e.g., sitting, standing, or lying down) to determine an anomalous condition related to lack of spinal mobility based on a difference between the features of the target patient's spine when the target patient is in different positions. The conditions may be ones that are associated with a particular type of surgery that the surgeon performs. For example, if a surgeon performs spinal fusion surgery, the conditions that a machine learning model 320 may identify may be ones that are typically treated with spinal fusion surgery. If a surgeon performs spinal decompression, the conditions that a machine learning model 320 may identify may be ones that are typically treated with spinal decompression.

Figure 3:
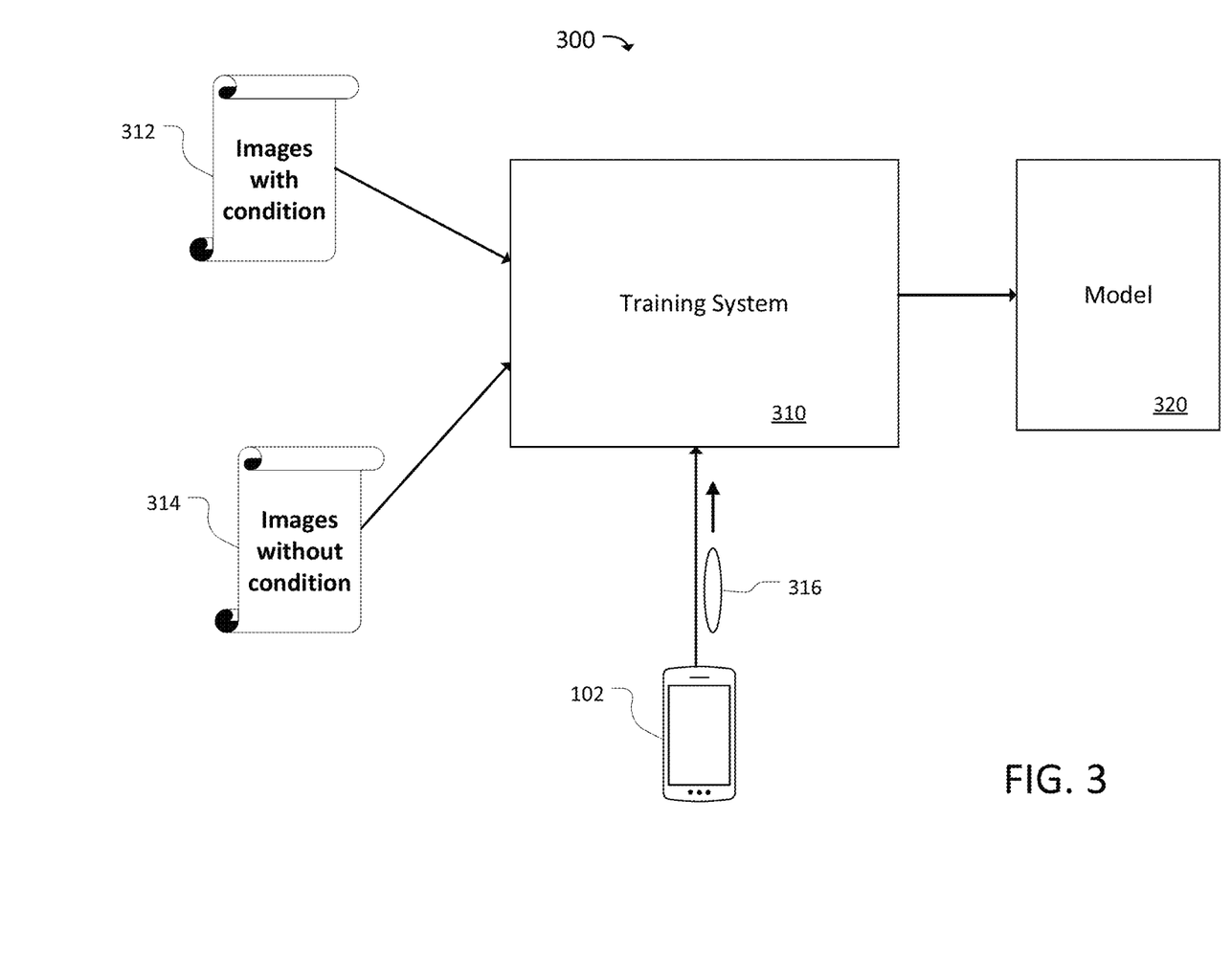
FIG. 3 shows an example model training environment.

In various embodiments, a machine learning model 320 may be trained on one or more preferences or characteristics of a surgeon. For example, a machine learning model 320 that is used to predict a condition of a target patient for one surgeon may be tailored to the preferences of that surgeon. As such, the prediction for a condition of a target client for surgery by one surgeon may differ from the prediction for condition of the same patient by a different surgeon.

A predicted condition of the target patient may be determined using one or more machine learning techniques or models such as, for example, a support vector machine learning model, logistical regression, or a neural network. A machine learning model 320 may be trained on one or more data sets for a desired bodily structure, pathology, condition, anomaly, classification and/or the like.

FIG. 3 shows an environment 300 for training the machine learning model 320. The environment 300 includes a model training system 310. As illustrated, the model training system 310 may train the machine learning model 320 on a data set for a particular spinal condition. The data set may include medical images (e.g., x-ray images, Digital Imaging and Communications in Medicine (DICOM) files, or other medical images) indicative of the spinal condition 312. The data set may also include images not indicative of the spinal condition 314. As an example, a spinal condition may include, without limitation, a fracture, the presence of a tumor, the presence of a deformity, the existence of trauma, the existence of stenosis, the existence of spondylolisthesis, the existence of disc herniation, and/or the like.

The model 320 may be trained on labeled images depicting a spinal condition 312 in one or more individuals. The model 320 may also be trained on labeled images not depicting a spinal condition 314. The labels may correspond to dimensions, properties or characteristics of various components, such as, for example, for aminal height, cord deformation, lateral recess volume, and/or the like. Through this training, the model 320 may learn features in the labeled images.

When a model 320 is applied to an image, it may generate a probability that a patient is exhibiting a condition learned by the model 320. The model 320 may be updated based on feedback 316 received from surgeon client electronic devices 102 associated with users of the system. For instance, if a model 320 predicts that it is unlikely that a patient has a particular condition, but the patient is diagnosed by a doctor as having that condition, the model 320 may be updated with this information to further refine the model 320.

In certain embodiments, the system may use pattern matching to determine whether a similarity exists between at least a portion of a patient medical image (e.g., an x-ray) and at least a portion of one or more images of a data set. For instance, the system may compare an image of a patient's spine with an image of a spine exhibiting a spinal condition determine if a similarity exists. A similarity may be determined to exist if a pixel-level analysis of the images results in a match within a certain degree of certainty or within a certain standard deviation. If a similarity exists, the system may identify the particular portion of the patient's anatomy exhibiting the condition.

In various embodiments, the system may retrieve condition-specific medical images from a data store that is a part of the system or that is other accessible by the system such as, for example, via a communication channel.

An obtained medical image may be converted to a format that is compatible with a machine learning technique, and the technique may be applied to the image representation.

In other embodiments, the system may analyze one or more medical images to determine a condition classification. A classification may refer to a specific type of medical condition. For instance, a spinal condition may be associated with a variety of different classifications such as, for example, a lumbar degenerative classification, an anterior-cervical classification, a three-joint complex degenerative classification, a cervical complex degenerative classification, an adult deformity classification, a pediatric deformity classification, a tumor classification and/or a trauma classification. Additional and/or alternate classifications may be used within the scope of this disclosure.

The system may determine a condition classification by applying a machine learning model 320 that compares at least a portion of one or more of the received patient medical images to at least a portion of one or more images associated with either a known classification or a lack of a known classification.

For instance, the system may want to determine whether a patient has experienced spinal trauma. The system may apply a machine learning model 320 that compares at least a portion of the medical images of a patient to at least a portion of the retrieved images to determine whether a similarity exists. In certain embodiments, a machine learning model 320 may use pattern matching to determine whether a similarity exists between at least a portion of a patient medical image and at least a portion of a classification-specific medical image. If a similarity exists, the system may identify the particular anatomy exhibiting the condition as the predicted anatomy for surgery.

In various embodiments, a trained machine learning model 320 may be applied to retrieved medical information to determine a predicted condition of a portion of the patient's anatomy.

The one or more pre-planning electronic devices 106 may provide 224 the indication of the predicted condition to the surgeon client electronic device 102, which may receive 226 the indication. For example, in the above example, the one or more pre-planning electronic devices 106 may cause an SMS message to be sent to the surgeon client electronic device 102 with an indication of the predicted condition, such as a name of the predicted condition, a description of the predicted condition, a visual representation of the predicted condition, and/or the like. For example, a pre-planning electronic device 106 may cause an SMS message to be sent to the surgeon client electronic device 102 with an indication that the predicted condition is spondylolisthesis of the L4 and L5 vertebrae.

In various embodiments, the user may provide an indication of acceptance or rejection, such as via a confirmation message or rejection message, of the predicted condition, which may be received 228 by the surgeon client electronic device 102. For example, in the context of SMS texting, the user may respond, via the surgeon client electronic device 102, with another SMS message that includes "Y" to confirm the predicted condition, or "N" to reject the predicted condition. Additional and/or alternate confirmation/rejection methods may be used within the scope of this disclosure. For example, a user may select a visual representation of confirmation and/or rejections to provide feedback via a web-based form, a software application, and/or the like. The surgeon client electronic device 102 may send 230 the indication of acceptance or rejection to the pre-planning electronic devices 106, which may receive 232 the indication.

Figure 6:
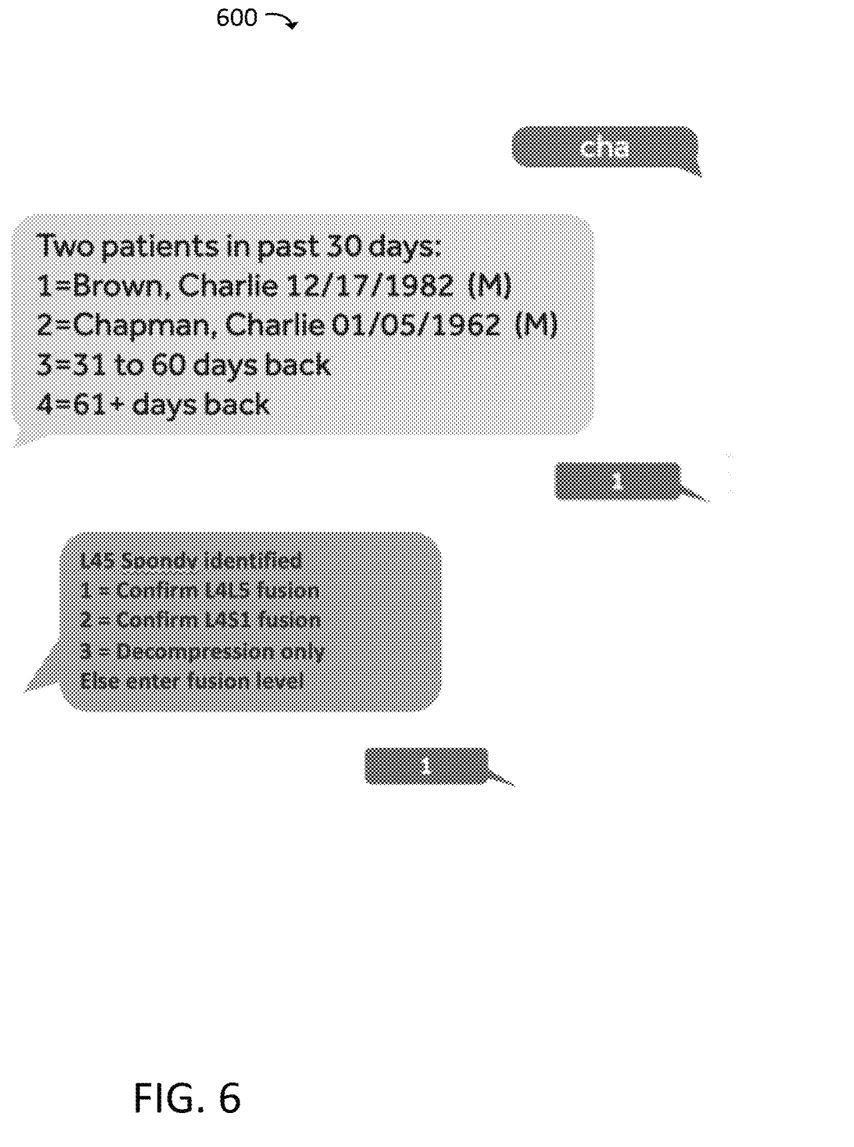
FIG. 6 shows example screenshots from a surgeon client electronic device.

FIG. 6 shows an example screenshot 500 of a surgeon client electronic device 102. Here, the surgeon enters the first 3 letters of the patent name ("cha"). The one or more pre-planning electronic devices 106 compare the letters "cha" to entries of one or more data stores that have been either requested or updated within the previous 30 days and identifies 208 two matches as results. The surgeon client electronic device 102 displays patient information corresponding to the two matching patient entries and also presents options for the surgeon to modify the search criteria, e.g., if the displayed patient information does not contain the patient of interest to the surgeon. Here, the surgeon client electronic device 102 presents options to modify the search criteria to search entries that have been requested or updated within the previous 31 to 60 days or entries that have been requested or updated more than 60 days ago. In response, the surgeon selects patient Charlie Brown by entering the number 1. The one or more pre-planning electronic devices 106 then retrieve 220 medical information for patient Charlie Brown, e.g., from an EMR data store 110 and/or a historical surgery data store 112 as illustrated in FIG. 1, and/or one or more other data stores and provide 224 an indication of the predicted condition to the surgeon client electronic device 102. Here, the surgeon client electronic device 102 displays the predicted condition spondylolisthesis of the L4 and L5 vertebrae requiring spinal fusion, and also displays alternative predicted conditions, including spondylolisthesis of the L4-S1 vertebrae requiring spinal fusion, and spondylolisthesis requiring spinal decompression. In response, the surgeon selects L4/L5 spinal fusion by entering the number 1.

Referring back to FIG. 2, the system may apply 234 a machine learning model 420 (FIG. 4) to the predicted condition and at least a portion of the retrieved medical information to identify a predicted approach for the surgery. For example, the system may identify one or more possible approaches for the surgery based on the confirmed predicted condition and/or the portion of the patient's anatomy associated with the condition. In various embodiments, one or more possible approaches may be stored in a data store in association with one or more conditions for which the surgical approach applies. The system may identify a possible approach by retrieving an approach that is associated with the identified predicted condition and/or the anatomy associated with the condition. In the example described above, the predicted approach to spondylolisthesis of the L4 and L5 vertebrae may be fusion of the L4/L5 vertebrae.

Examples of predicted approaches may include, without limitation, transforaminal lumbar interbody fusion (TLIF), posterior lumbar interbody fusion (PLIF), anterior lumbar interbody fusion (ALIF), oblique lateral interbody fusion (OLIF), and/or the like.

Figure 4:
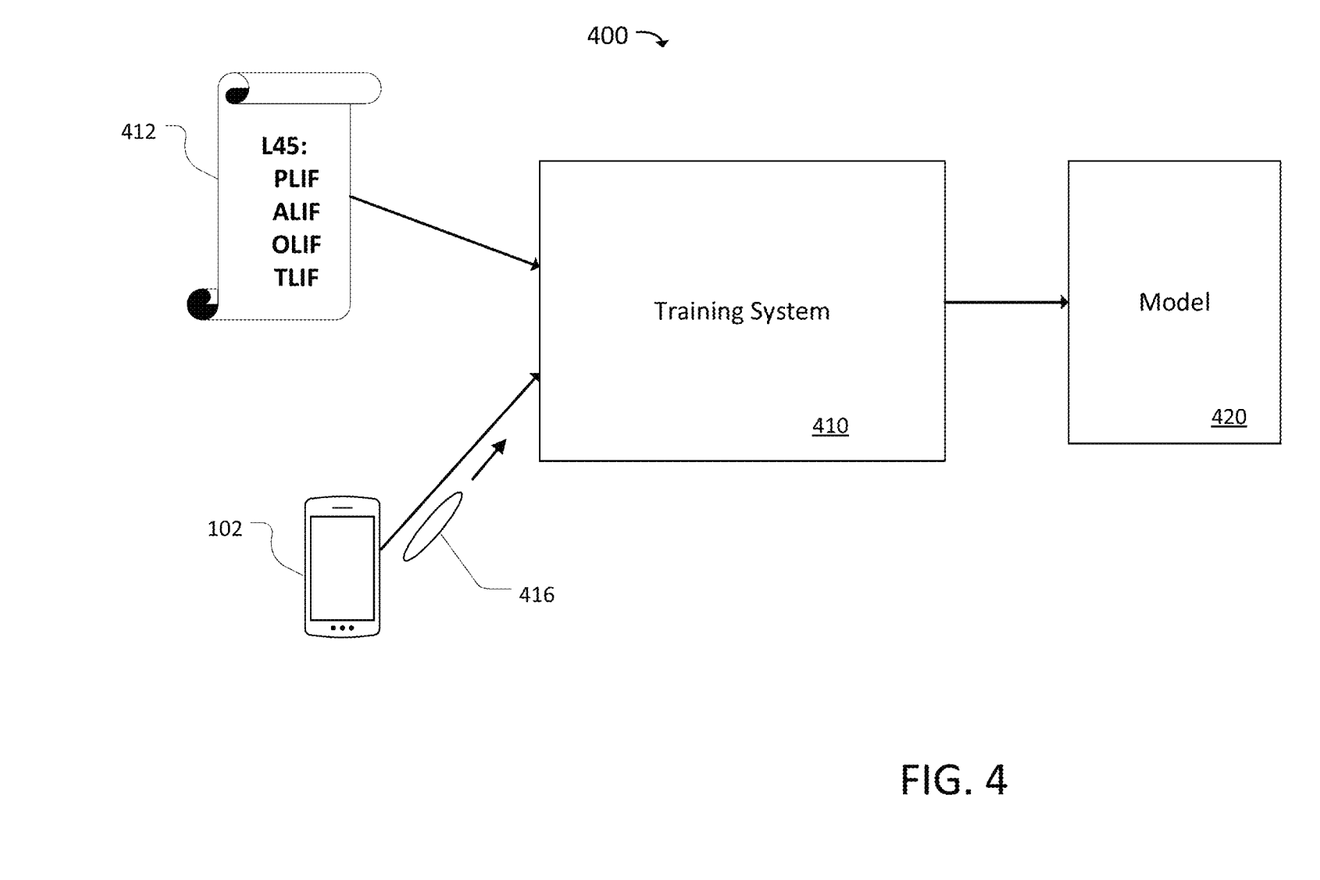
FIG. 4 shows an example model training environment.

FIG. 4 shows an environment 400 for training the machine learning model 420. The environment includes a model training system 410. As illustrated, the system may train the machine learning model 420 using information compiled through one or more surgeon preference sheets 412 and feedback received from the surgeon client electronic device 102 regarding the same. For example, a preference sheet 412 may include one or more ranked options for surgical approaches for one or more conditions. The ranking may be in accordance with the surgeon's preferences. For example, a surgeon may prefer PLIF, ALIF, OLIF, and TLIF (in decreasing order of preference) for fusion of the L4/L5 vertebrae.

As an example, a preference sheet 412 may list a surgeon's first, second, third, and fourth choices for surgical implant families at each level of spinal surgery (i.e., which portion of the spinal column is associated with the condition). These choices may be subdivided based on various patient-specific characteristics such as, for example, diagnosis, procedure codes from the patient's EMR, anomalies identified via imaging, patient data (e.g., age, gender, body mass index, and/or the like), more detailed data available from EMRs (e.g., lab test results, physical exam results, co-morbidities, and/or the like), etc.

The system may predict an approach for the surgery based on the information from the preference sheet 412. The surgeon (or another authorized user) may provide feedback 416 to the model 420 such as, for example, through a planning interface. A planning interface may be implemented through SMS, a web-browser, a software application, and/or the like. For instance, if the system recommends an disfavored approach, a surgeon may adjust the recommendation to the approach that he or she prefers, and the model 420 may be updated to account for this preference when applied in future situations. For example, the surgeon may prefer OLIF procedures using the PIVOX™ Oblique Lateral Spinal System at L45. Thus, the model 420 may be trained to more accurately predict a surgical approach based on the surgeon's past indications of preference for patients with similar conditions. In some examples, the model 420 is trained based on aggregate data for groups of surgeons.

The machine learning model 420 may be implemented using one or more machine learning techniques or models such as, for example, a support vector machine learning model, logistical regression, or neural networks. A machine learning model 420 may generate a probability that an approach is the desired approach for a surgical procedure for the surgeon. The model 420 may be updated based on feedback 416 received from users of the system. For instance, as described above, if a model 420 predicts a particular approach, but the surgeon elects a different approach, the model 420 may be updated with this information to further refine the model 420.

In various embodiments, once the surgical approach is selected, the system may select surgical components to use during the selected surgery. In some implementations, the selection of surgical components (and/or dimensions of the surgical components) is based on one or more preoperative radiographic measurement of the patient. The radiographic measurements may be based on the medical images the system used to predict the condition of the patient or other medical images of the anatomy of the patient from which dimensions and/or relative position of the anatomical parts of the patient can be determined. In the example of spinal surgery, the radiographic measurements may include, but not be limited to, the sagittal vertical axis (SVA) of the spine, the C2-7 angle, the C7 Slope angle (C7S), the degree of Thoracic Kyphosis (TK), as well as regional alignment parameters such as the Lumbar Lordic angle (LL), Sacral Slope (SS), Pelvic Tilt (PT), or Pelvic Incidence (PI), as well as segmental measurements.

Figure 5:
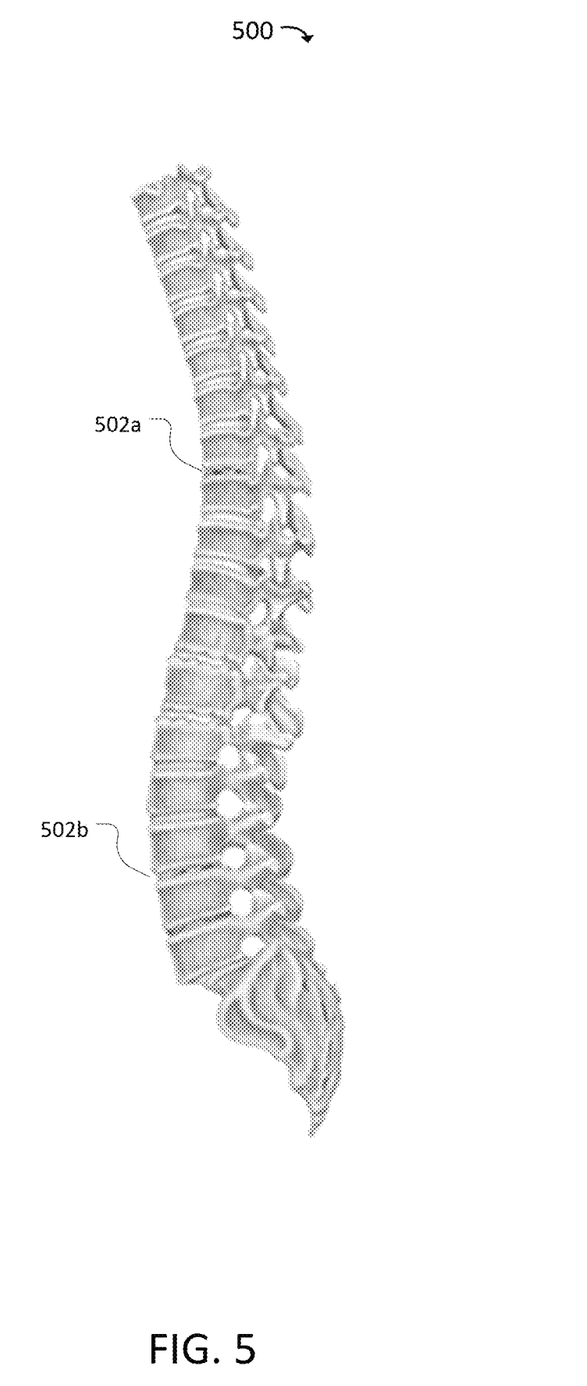
FIG. 5 shows an example medical image of a spine.

In some examples, the system plans the surgery based on values derived from the radiographic measurements. In the example of spinal surgery, derived values may include average dimensions or relative positions of vertebrae (e.g., posterior disc height or degree of segmental lordosis). FIG. 5 shows an example medical image of a spine 500. The average values may exclude portions of the spine, such as the portion to be operated on, or portions exceeding quantitative thresholds such as reduced disc height, spondylolisthesis, and the like. FIG. 5 shows discs 502a, 502b having reduced height, e.g. due to degenerative disease. The average values may exclude diseased discs 502a, 502b. The system may also base the surgical plan on surgeon preferences such as thresholds for excluding portions of the spine, posterior disc height thresholds related to maximizing indirect decompression, correction thresholds related to restoring spinal alignment, and parameters related to resolving any differences between a target spinal geometry and available medical implants to achieve the target geometry.

The system may select surgical components based on the surgical plan. For example, the system may define a target segmental fusion construct by determining if disc height needs to be restored, and adding posterior and anterior height to achieve an average lordosis-adjusted target based on average values from the radiographic measurements and by first setting the posterior height then determining the anterior height based on the target segmental lordosis value. If needed, the system may then adjust the listhetic offset of a portion of the spine of the surgical plan. If further correction is needed, the system may allocate correction lordosis across a portion of the spine set according to a surgeon-specified process. The system may iterate the previous steps to fine-tune parameters of the surgical plan and to ensure that the projected global SVA is within a predefined range and that no portion of the spine is at risk (e.g., based on subsidence or reduced decompression). Once the system has fine-tuned parameters of the surgical plan, the system may select surgical components (and dimensions of surgical components) from the surgical component data store 114, or other source of known implants. For example, the system may plan an OLIF surgery based on an L45 lordotic angle (derived from radiographic measurements), available PIVOX™ cage angles, and the surgeon's past preferences, to select a 16° PIVOX™ cage. In some implementations, if the surgical components selected for the operation are available (e.g., as indicated by the surgical component data store 114), the system may schedule the surgery, e.g., via the Surgery calendar 116. The Surgery calendar 116 may be synchronized with a calendar system of the surgeon client electronic device 102.

Optionally, the system may train and/or apply one or more machine learning algorithms to the radiographic images and surgeon preferences to automatically select surgical components (and dimensions of surgical components). The system may train the model, e.g., using data collected by surgical component inventory management systems or by surgical component sales representatives who identify the specific components that are actually used during surgery, compared to predictions previously made using the model.

Figure 7:
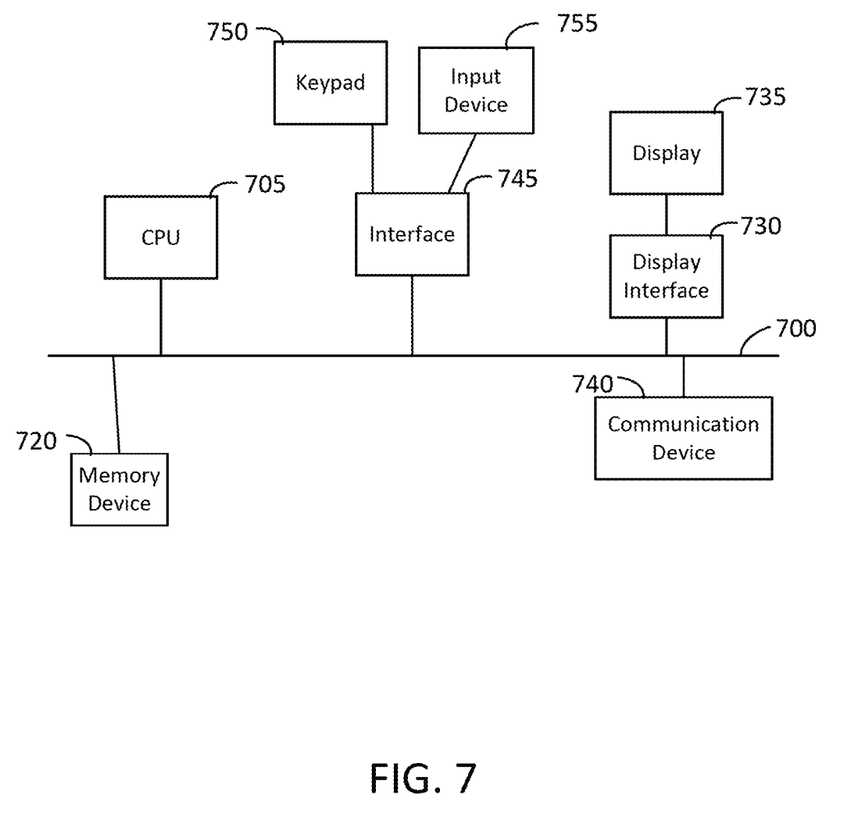
FIG. 7 shows a block diagram of an example of internal hardware that may be used to contain or implement program instructions according to an embodiment.

FIG. 7 illustrates example hardware that may be used to contain or implement program instructions. A bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 7, is an example of a processor as such term is used within this disclosure. Read only memory (ROM) and random-access memory (RAM) constitute examples of non-transitory computer-readable storage media 720, memory devices or data stores as such terms are used within this disclosure.

Program instructions, software or interactive modules for providing the interface and performing any querying or analysis associated with one or more data sets may be stored in the memory device 720. Optionally, the program instructions may be stored on a tangible, non-transitory computer-readable medium such as a compact disk, a digital disk, flash memory, a memory card, a USB drive, an optical disc storage medium and/or other recording medium.

An optional display interface 730 may permit information from the bus 700 to be displayed on the display 735 in audio, visual, graphic or alphanumeric format. Communication with external devices may occur using various communication ports 740. A communication port 740 may be attached to a communications network, such as the Internet or an intranet.

The hardware may also include an interface 745 which allows for receipt of data from input devices such as a keypad 750 or other input device 755 such as a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also, that various presently unforeseen or unanticipated alternatives, modifications, variations or improvements therein may be subsequently made by those skilled in the art which are also intended to be encompassed by the following claims.

What is claimed is:

1. A system for generating a pre-operative plan, the system comprising:
   one or more computer readable storage devices configured to store a plurality of computer executable instructions; and
   one or more hardware computer processors in communication with the one or more computer readable storage devices and configured to execute the plurality of computer executable instructions, the plurality of computer executable instructions configured to, when executed, cause the processor to:
      receive, from an electronic device associated with a physician, an identification message comprising identifying information associated with a target patient for a surgical procedure;
      retrieve medical information associated with the target patient based on the identifying information;
      apply a first machine learning model to at least a portion of the medical information to identify a predicted condition of the target patient;
      transmit an indication of the predicted condition to the electronic device;
      in response to receiving a confirmation message of the predicted condition from the electronic device, apply a second machine learning model to the predicted condition to predict a surgical approach and one or more surgical components to use;

receive one or more radiographic measurements associated with the target patient, wherein the radiographic measurements comprise alignment parameters and/or segmental measurements;

receive one or more correction thresholds related to restoring spinal alignment; and generate a surgical plan comprising steps to achieve a target spinal geometry, the surgical plan based on the one or more radiographic measurements, the one or more correction thresholds, the indication of the surgical approach, and the indication of the one or more surgical components.

2. The system of claim 1, wherein causing the system to apply the first machine learning model to at least a portion of the medical information comprises:

causing the system to train the first machine learning model on a data set for the surgical procedure, wherein the data set comprises one or more images depicting one or more conditions of anatomy corresponding to the surgical procedure; and causing the system to apply the trained first machine learning model to the at least a portion of the medical information to identify the predicted condition.

3. The system of claim 1, wherein causing the system to apply the first machine learning model to at least a portion of the medical information comprises:

causing the system to train the first machine learning model on a data set for the surgical procedure, wherein the data set comprises one or more images depicting one or more conditions of anatomy corresponding to the surgical procedure and feedback from the physician diagnosing a condition depicted in an image; and causing the system to apply the trained first machine learning model to the at least a portion of the medical information to identify the predicted condition.

4. The system of claim 1, wherein causing the system to apply the second machine learning model to the predicted condition comprises:

causing the system to train the second machine learning model on a data set for the surgical approach, wherein the data set comprises surgeon preferences for the predicted condition; and causing the system to apply the trained second machine learning model to the predicted condition to predict the surgical approach.

5. The system of claim 1, wherein causing the system to apply the second machine learning model to the predicted condition to predict one or more implants for the target patient comprises causing the system to determine a shape and a size associated with the one or more implants based on radiographic images of the target patient.

6. The system of claim 1, wherein the system is further caused to:

apply the first machine learning model to at least a portion of the medical information to determine a probability of the predicted condition of the target patient;

apply the first machine learning model to at least a portion of the medical information to determine a probability of a second predicted condition of the target patient; and transmit the probability of the predicted condition and the probability of the second predicted condition to the electronic device.

7. The system of claim 1, wherein the system is further caused to select one or more surgical components from a surgical component data store based on the surgical plan.

8. The system of claim 1, further comprising applying the first machine learning model to at least a first portion of the medical information and at least a second portion of the medical information to identify the predicted condition of the target patient based on a difference between the first portion and the second portion.

9. The system of claim 1, wherein:

the instructions that are configured to cause the processor to receive the one or more correction thresholds comprise instructions that cause the processor to receive a lordosis threshold;

the instructions are further configured to cause the processor to determine a height adjustment target based on the one or more radiographic measurements; and the instructions that are configured to cause the processor to generate the surgical plan comprise instructions that are configured to cause the processor to generate the plan comprising the step:

adding posterior and anterior height to a construct to achieve the height adjustment target and the lordosis threshold.

10. The system of claim 9, wherein the instructions that are configured to cause the processor to determine the height adjustment target based on the one or more radiographic measurements comprise instructions configured to cause the processor to determine an average disc height for a portion of a spine, the average disc height excluding discs having a height that satisfies a reduced-height threshold.

11. A method of automatically generating a pre-operative plan, the method comprising:

by a computing device:

receiving, from an electronic device associated with a physician, an identification message comprising identifying information associated with a target patient for a surgical procedure;

retrieving medical information associated with the target patient based on the identifying information;

applying a first machine learning model to at least a portion of the medical information to identify a predicted condition of the target patient;

transmitting an indication of the predicted condition to the electronic device; in response to receiving a confirmation message of the predicted condition from the electronic device, applying a second machine learning model to the predicted condition to predict a surgical approach and one or more surgical components to use;

receiving one or more radiographic measurements associated with the target patient, wherein the radiographic measurements comprise alignment parameters and/or segmental measurements;

receiving one or more correction thresholds related to restoring spinal alignment; and generating a surgical plan comprising steps to achieve a target spinal geometry, the surgical plan based on the one or more radiographic measurements, the one or more correction thresholds, the indication of the surgical approach, and the indication of the one or more surgical components.

12. The method of claim 11, wherein applying the first machine learning model to at least a portion of the medical information comprises:

training the first machine learning model on a data set for the surgical procedure, wherein the data set comprises one or more images depicting one or more conditions of anatomy corresponding to the surgical procedure; and applying the trained first machine learning model to the at least a portion of the medical information to identify the predicted condition.

13. The method of claim 11, wherein applying the first machine learning model to at least a portion of the medical information comprises:

training the first machine learning model on a data set for the surgical procedure, wherein the data set comprises one or more images depicting one or more conditions of anatomy corresponding to the surgical procedure and feedback from the physician diagnosing a condition depicted in an image; and applying the trained first machine learning model to the at least a portion of the medical information to identify the predicted condition.

14. The method of claim 11, wherein applying the second machine learning model to the predicted condition comprises:

training the second machine learning model on a data set for the surgical approach, wherein the data set comprises surgeon preferences for the predicted condition; and applying the trained second machine learning model to the predicted condition to predict the surgical approach.

15. The method of claim 11, wherein applying the second machine learning model to the predicted condition to predict one or more implants for the target patient comprises determining a shape and a size associated with the one or more implants based on radiographic images of the target patient.

16. The method of claim 11, further comprising:

applying the first machine learning model to at least a portion of the medical information to determine a probability of the predicted condition of the target patient;

applying the first machine learning model to at least a portion of the medical information to determine a probability of a second predicted condition of the target patient; and transmitting the probability of the predicted condition and the probability of the second predicted condition to the electronic device.

17. The method of claim 11, wherein predicting one or more surgical components comprises selecting the one or more surgical components from a surgical component data store based on the surgical plan.

18. The method of claim 11, further comprising applying the first machine learning model to at least a first portion of the medical information and at least a second portion of the medical information to identify the predicted condition of the target patient based on a difference between the first portion and the second portion.

19. The method of claim 11, wherein:

receiving the one or more correction thresholds comprises receiving a lordosis threshold;

the method further comprises determining a height adjustment target based on the one or more radiographic measurements; and generating the surgical plan comprises generate the plan comprising the step:

adding posterior and anterior height to a construct to achieve the height adjustment target and the lordosis threshold.

20. The method of claim 19, wherein determining the height adjustment target based on the one or more radiographic measurements comprises determining an average disc height for a portion of a spine, the average disc height excluding discs having a height that satisfies a reduced-height threshold.

* * * * *